(12) United States Patent
Shull

(10) Patent No.: US 6,526,295 B1
(45) Date of Patent: Feb. 25, 2003

(54) POWER CONSERVATION METHOD IN MOBILE COMMUNICATIONS DEVICE

(75) Inventor: Eric Alan Shull, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/417,854

(22) Filed: Oct. 14, 1999

(51) Int. Cl.[7] ............................................. H04B 7/216
(52) U.S. Cl. .................... 455/574; 455/127; 455/115; 370/342
(58) Field of Search ................................ 455/574, 127, 455/115; 331/176; 370/342

(56) References Cited

U.S. PATENT DOCUMENTS

| | | | |
|---|---|---|---|
| 5,564,901 A | 10/1996 | Goldinger | |
| 5,740,517 A | * 4/1998 | Aoshima | .................. 340/7.34 |
| 5,839,059 A | * 11/1998 | Hakkinen et al. | .......... 331/176 |
| 6,278,703 B1 | * 8/2001 | Neufeld | ...................... 370/337 |
| 6,353,749 B1 | * 3/2002 | Siponen | ...................... 455/343 |

FOREIGN PATENT DOCUMENTS

| | | |
|---|---|---|
| GB | 2320654 A | 6/1998 |
| WO | WO 00/35220 | 6/2000 |

* cited by examiner

*Primary Examiner*—William Cumming
*Assistant Examiner*—Alan T. Gantt
(74) *Attorney, Agent, or Firm*—Coats & Bennett, P.L.L.C.

(57) ABSTRACT

A power savings method comprises delaying turning on the local oscillator of a mobile phone while the processor of the mobile phone sorts through a previously received neighbor list. While the local oscillator is settling at its operating frequency, the mobile phone receives signals from the neighbor list channels and measures their relative strength. Compensation factors are applied to correct for frequency errors arising from the fact that the local oscillator has not settled at its operating frequency. A method is further disclosed for generating the compensation factors for use in the power savings method.

20 Claims, 7 Drawing Sheets

POWER CONSERVATION METHOD IN MOBILE COMMUNICATIONS DEVICE

BACKGROUND OF THE INVENTION

1. Field of the Invention

This invention pertains to a method conserving power in a mobile communications device.

2. Description of the Related Art

Mobile communications devices have become ubiquitous in modern society. They include, without limitation, cellular telephones, personal digital assistants and pagers. These devices come in a myriad of shapes and sizes as well as different functional capabilities. As the name implies, mobile communications devices are designed to help people remain in contact while on the move. While the following discussion is couched in terms of mobile phones, it is equally applicable to other mobile communications devices.

Presently, mobile phones register with a nearby base station for connection to the mobile network. As part of this registration process, the phone is assigned a paging channel and "camps" thereon, in effect remaining tuned to that particular channel until something causes it to change channels. The paging channel typically sends a page message that contains a temporary mobile station identity (TMSI) to alert a particular mobile phone that a call has been received. The TMSI was previously assigned to the mobile phone by the associated base station with which the phone is presently registered. When the mobile phone detects a match of the TMSI sent by the base station to the TMSI stored in its memory, it will alert the user that an incoming call is to be received. In order to detect a match of the TMSI, the phone must receive and demodulate the paging channel. If the user decides to answer the call (typically by pressing the "SEND" or "TALK" key), the mobile phone sends further messages to the base station indicating that it is answering the call.

Thus, the phone receives instructions about incoming calls and sends outgoing requests on this paging channel. Because the phone is mobile, the phone needs to know what are alternative channels that it can use as it moves around. These alternative paging channels may or may not be provided by the same base station, but in all likelihood are provided by neighboring base stations. To alert the phone of possible alternative channels, the base station, on whose channel the phone is presently camped, sends out a list of the most likely alternative channels called the Neighbor List, which includes the present channel that the phone is camping on. The phone periodically checks the signal strengths of these alternative channels and determines whether or not to switch paging channels to provide better phone to base station communication.

Because the paging channel is designed to be present at pre-scheduled times on a designated channel and time slot, the phone can be put to "sleep." Putting a phone to sleep involves minimizing the computational functions of the phone in order to conserve power. Power conservation is important for battery driven mobile phones. The less power consumed, the longer the phone can operate without interruption. As a result, many efforts are made to conserve power within mobile phones. A prime time to "sleep" a phone occurs during the time during which the phone does not have to receive and demodulate the paging channel. The phone periodically wakes up, receives and demodulates the paging channel. If the phone detects no page, i.e. there is not a match between the TMSIs, then the phone returns to sleep until time to check the paging channel again.

In typical phones, the phone also uses this awake period to check the neighbor list to determine if reselection is required, or to update the status of which of the neighbor list channels are desirable candidates for reselection. To this end, after the phone receives and demodulates the paging channel, the phone receives signals from the base stations included on its presently existing neighbor list. Based on ANSI-136, the phone knows what sort of signal it expects to receive on each channel of the neighbor list. The received signals are used to compute an Received Signal Strength Indicator (RSSI) for each channel, i.e., each neighboring channel has its own RSSI. Typically an individual running average of the RSSI is kept for each of the available channels on the Neighbor List from the neighboring base stations.

In the process of waking up, a local oscillator must be powered up and allowed to settle at its operating frequency prior to receiving and demodulating the channel on which the phone is presently camped. This delay is due to the fact that to receive and demodulate the paging channel, the phone must be close (within 200 Hz or so) in frequency to the paging channel. It takes time for the oscillator to achieve that degree of accuracy. Presently, during this power up phase, the local oscillator is not used, although it is draining power from the battery, thus shortening the battery life without tangible benefit.

SUMMARY

Switching the order in which the mobile phone does its administrative functions during the waking periods may more efficiently use the wasted energy associated with the prior art technique. Specifically, the mobile phone checks the received signal strengths of the channels on the neighbor list while the local oscillator is powering up and may not yet have settled at its operative frequency. By the time the neighbor list has been checked, the local oscillator will have settled at its operative frequency and the mobile phone can check for any paging calls on the paging channel and demodulate the same. This eliminates time wasted waiting for the local oscillator to settle and allows the local oscillator to be turned on for a shorter period of time, thus saving power. Because the local oscillator has not settled, measurements of the channels on the neighbor list may be offset by a predetermined amount to provide a more accurate measurement of the received signal strength. Offsets are determined during a factory calibration routine. These offsets or compensation factors can be stored in a look up table or the like.

Alternate embodiments allow for refinements on this technique. Where one channel clearly exceeds all other measured channels by a factor greater than the values contained in the look up table, the phone does not necessarily need to apply the compensation factors unless needed for the RSSI calculations. Additionally, the relative strengths of the channels on the neighbor list are stored in memory between awake periods and the mobile phone preferably checks the list in ascending order of relative power to minimize interference between channels.

DETAILED DESCRIPTION OF THE PREFERRED EMBODIMENTS

Figure 1:
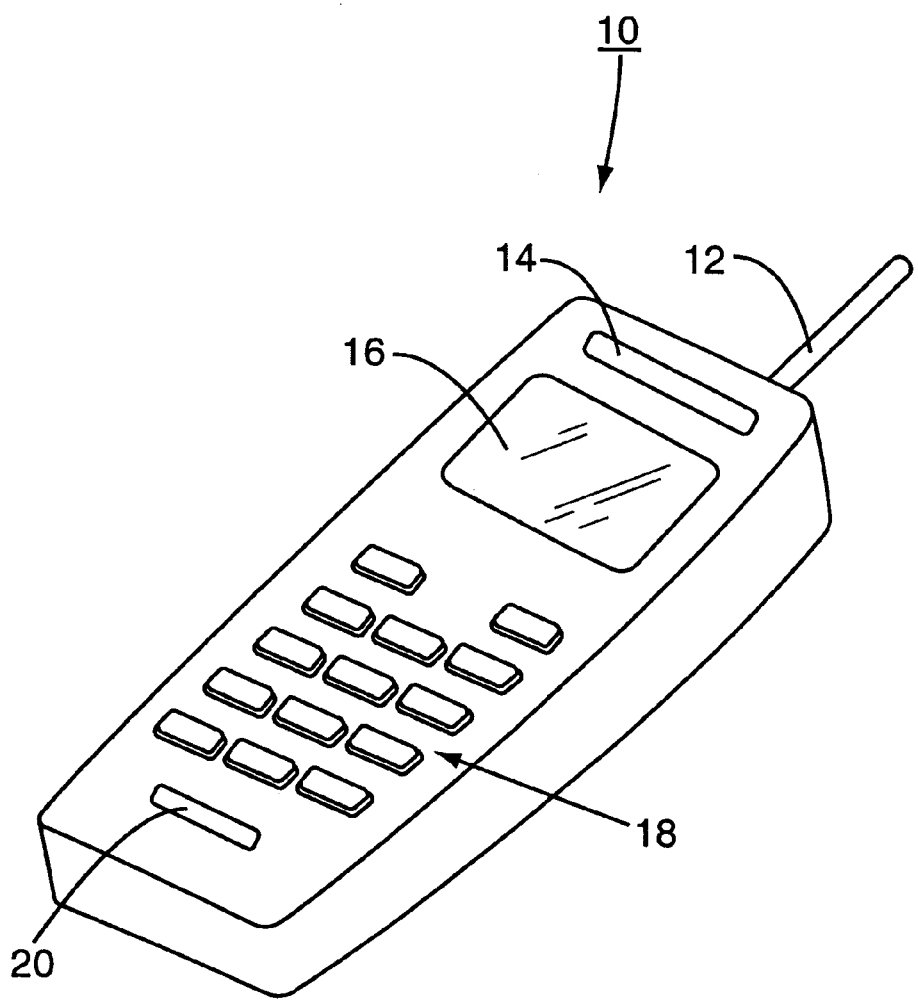
FIG. 1 is a simplified perspective view of a mobile communications device.

Turning now to the drawings, FIG. 1 shows a mobile communications device such as a mobile phone 10 with an RF antenna 12, a speaker 14, a display 16, a keypad 18 and a microphone 20. The present invention is well suited for use with the mobile phone 10 or other similar devices such as pagers, personal digital assistants or the like.

Figure 2:
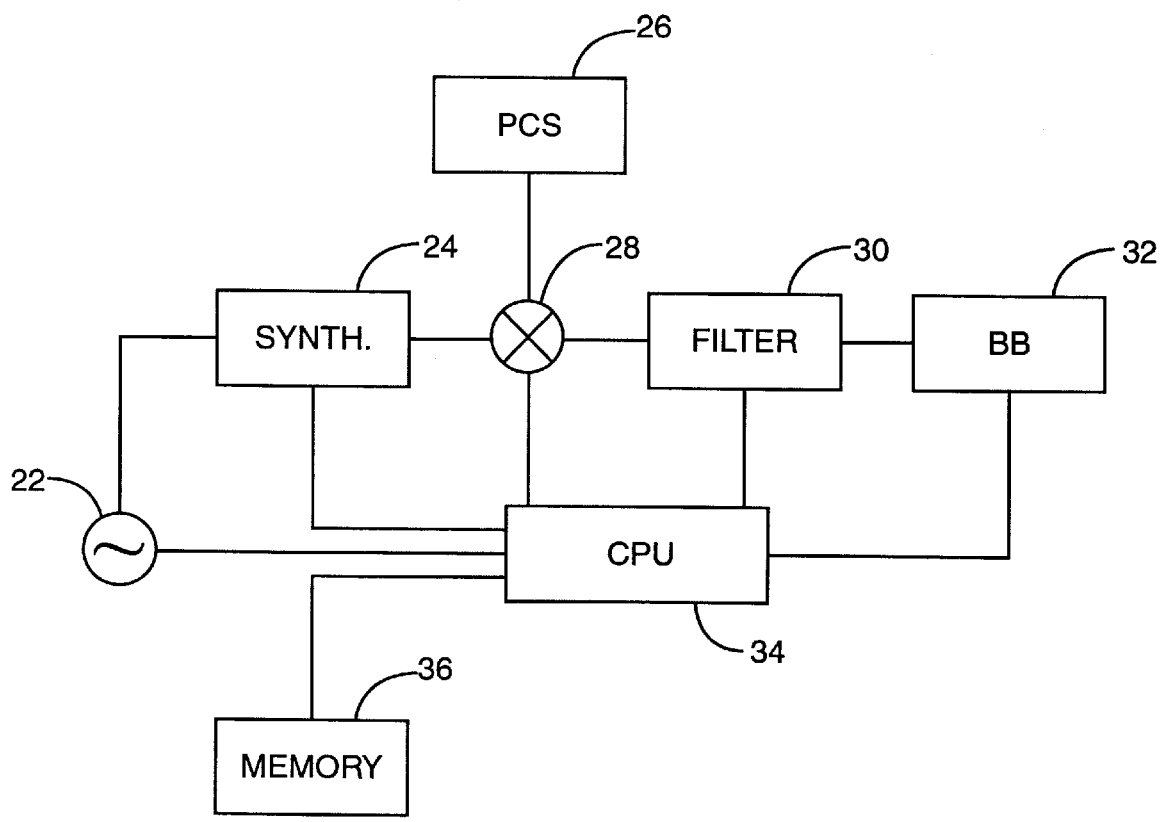
FIG. 2 is a prior art signal processing system as used in the mobile communications device of FIG. 1.

As seen in FIG. 2, the mobile phone 10 includes a local oscillator 22, a synthesizer 24, an incoming signal 26, a mixer 28, a filter 30, a base band processing module 32, and a central processing unit 34. The local oscillator 22 may be a temperature compensated crystal oscillator or the like, and typically oscillates at approximately 19.4 MHz. The synthesizer 24 is preferably phase locked and translates the signal from the oscillator 22 to a signal operating at approximately 2 GHz, which corresponds to the frequency of the incoming signal 26. The two signals are mixed in mixer 28 and filtered by filter 30 for further processing in the base band processing module 32. The central processing unit 34 controls all the functions of the phone and may include a memory storage device 36 associated therewith.

Figure 3:
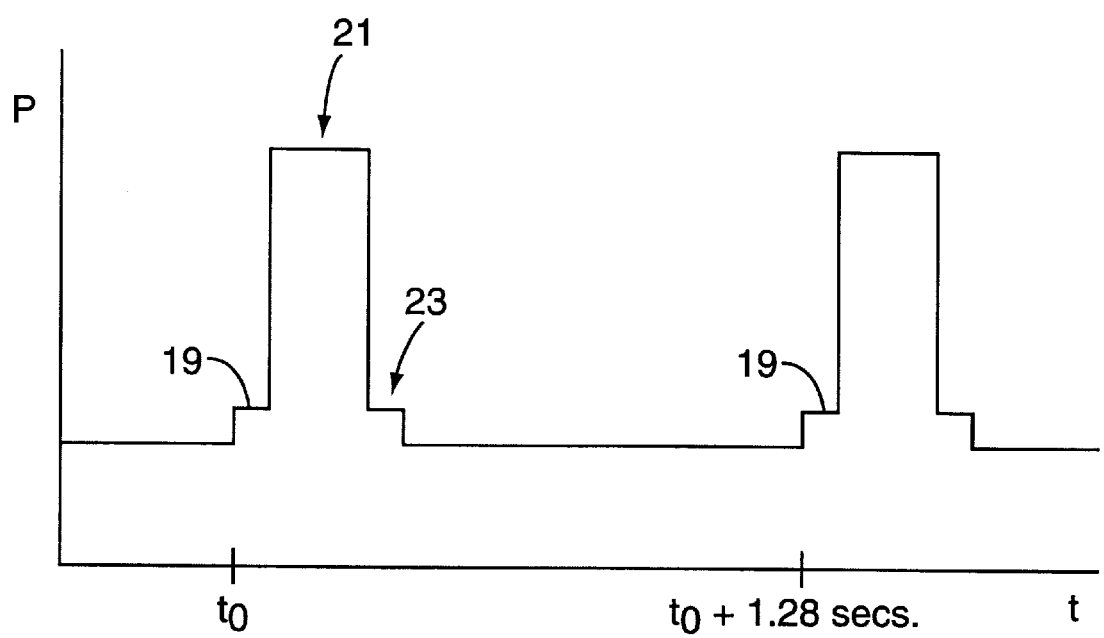
FIG. 3 is a graph of the prior art power consumption versus time.

In the past, it has been common to put the mobile communications device 10 into a sleep mode wherein power is used as little as possible. An example of the prior art sleep mode power consumption is seen in FIG. 3. Power consumption stays fairly constant at a low level throughout most of the cycle, but at time to the mobile phone 10 powers up the local oscillator 22 (FIG. 2) as noted generally at 19. This causes an immediate increase in the power consumption. At some time after $t_0$ the control channel from the base station is received and demodulated, resulting in a higher power consumption area 21. After the demodulation, the mobile communications device performs some minor tasks which result in a lower power consumption as generally seen at 23. One of the tasks performed at 23 is setting up a low frequency (typically 32 kHz) clock which counts transitions of the clock until the next frame interval at which time the mobile communications device 10 again powers up the local oscillator 22. In ANSI-136, the frame period are 1.28 seconds, so the clock is to count until $t_0+1.28$ seconds is reached; however, other frame periods may be used depending on the relevant operating standard used by the mobile communications device 10.

Figure 4:
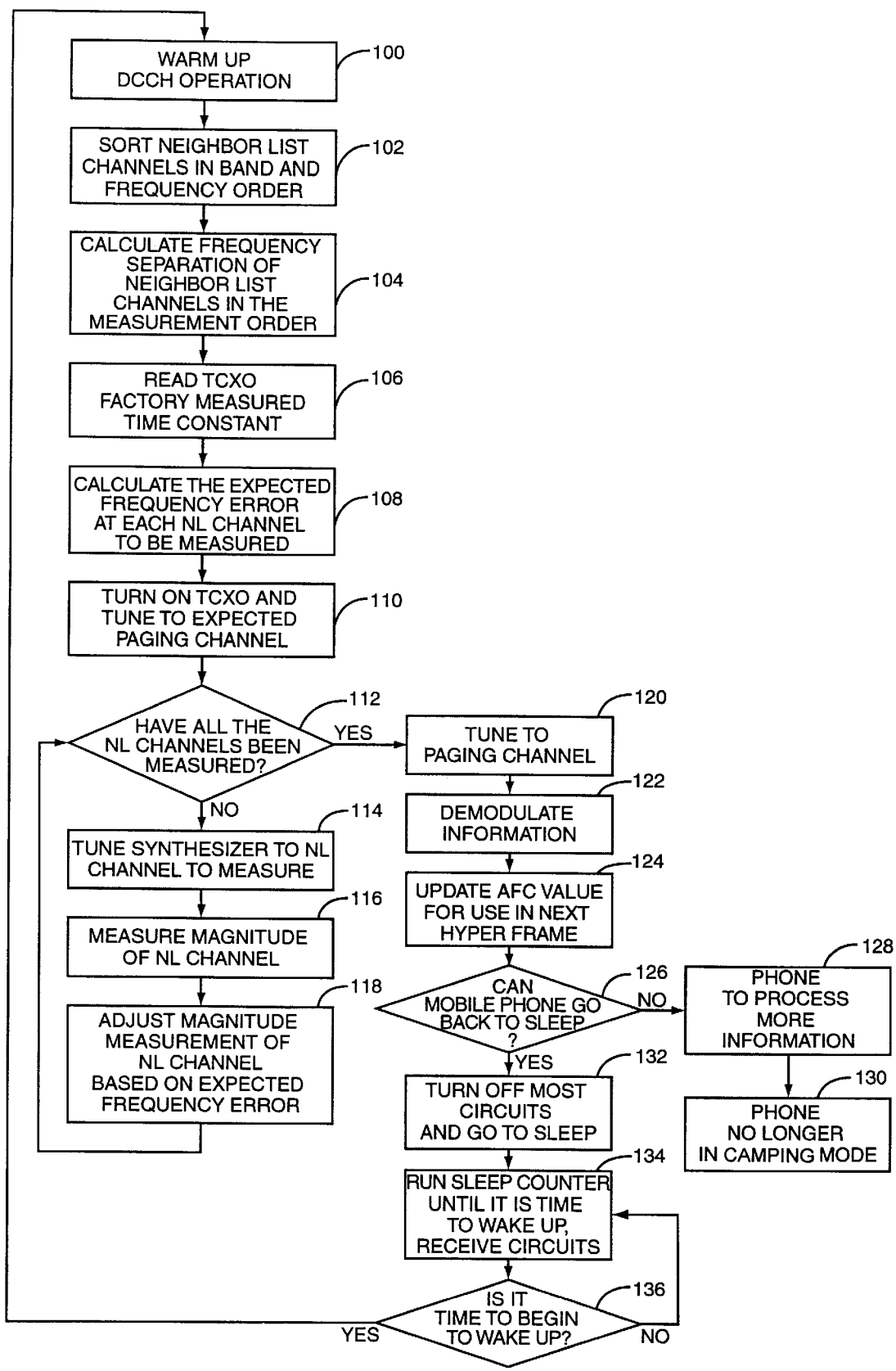
FIG. 4 is flow diagram of the method of the present invention.

The present invention replaces the non-used portion of time where the local oscillator 22 is warming up (19) with a productive use of said time. Specifically, that time is used to check the neighbor list for appropriate reselection candidates. Turning now to FIG. 4, at the appropriate point in each period, the mobile phone 10 wakens the processor 34 (block 100). The phone processor 34 sorts the neighbor list channels in band and frequency order (block 102). Then the processor 34 calculates the frequency separation of the neighbor list channels in the measurement order (block 104). The processor then reads the oscillator time constant (block 106). An expected frequency error at each neighbor list channel to be measured is calculated (block 108). Only now is the local oscillator 22 turned on and tuned to the value corresponding to the expected paging channel value (block 110). As the local oscillator 22 warms up and settles, the processor 34 asks if all the neighbor list channels have been measured (block 112). When the answer is no, the processor 34 tunes the synthesizer 24 to the first or next neighbor list channel to measure (block 114). The phone 10 receives the signal from the neighbor list channel through the antenna 12 and measures the signal strength of the neighbor list channel (block 116). The processor 34 adjusts the magnitude of the measurement of the neighbor list channel based on the expected frequency error (block 118) and returns to block 112. In order for this to work, the frequency error between the received frequency and the presently operative oscillator frequency should be less than about 4 kHz and more preferably less than about 3 kHz.

When the answer to block 112 is yes, all the neighbor list channels have been measured, the phone 10 tunes to the paging channel (block 120). By this time, the local oscillator 22 should have settled, and the paging channel can be tightly tuned. The base band processor 32 demodulates the information on the paging channel (block 122) which may include an updated neighbor list. The processor 34 then updates the Automatic Frequency Control (AFC) value for use in the next frame to demodulate the paging channel (block 124).

Based in part on the information contained in the demodulated paging channel, the processor 34 then checks to see if the phone 10 can return to sleep (block 126). If the answer is no, then the phone 10 processes more information (block 128). This may include channel reselection based on the measured values of the neighbor list channels, receive an incoming call or the like. The end result of which is that the phone 10 is no longer in camping mode (block 130).

If the answer to block 126 is yes, then the phone 10 turns off most of the hardware circuits within the phone 10 to save power (block 132). The phone 10 then sets the sleep counter until it is time to repeat the process (blocks 134 and 136).

Figure 5:
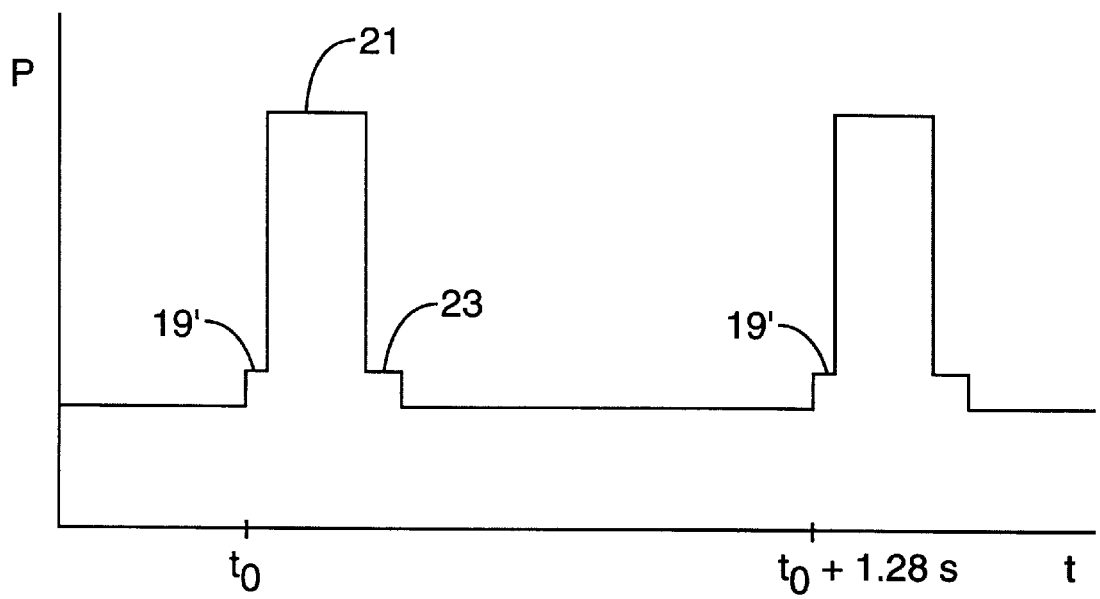
FIG. 5 is a graph of the power consumption versus time as used in the present invention.

The end result of this process is less power consumption by delaying the time that the local oscillator 22 is turned on. Additionally, the time that oscillator 22 is on is used more productively, thus justifying the power expenditure. A time versus power consumption graph can be seen in FIG. 5. The power up phase 19' is now much shorter than in the prior art device. High power consumption period 21 and shut down period 23 remain relatively unchanged, resulting in a net savings of power.

Figure 6:
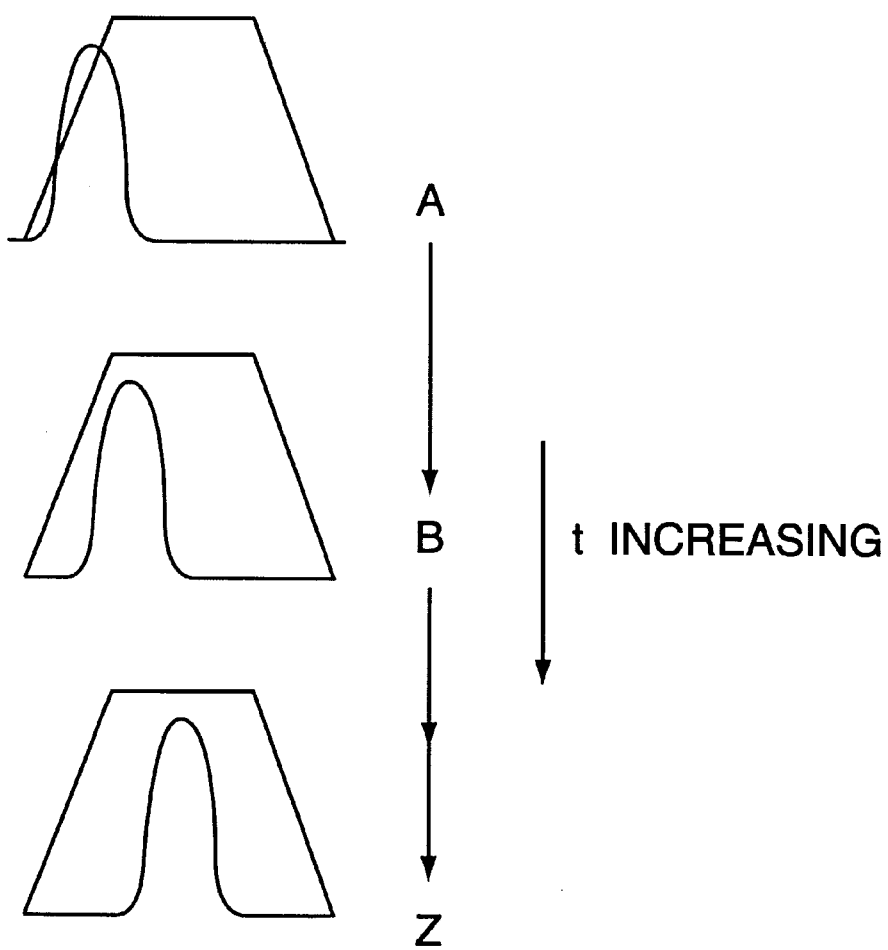
FIG. 6 is a schematic representation of the filter responses relative to time for the checking of neighbor list channels as performed by the method of the present invention.

In essence, when the local oscillator 22 is settling, any measurements taken by the phone 10 are off in frequency. This means that when the signal reaches the filter 30, the signal will not be at the center line frequency of the filter 30. As a result, the signal may be dampened by the filter 30 and result in a perceived lower signal strength than had actually been received. FIG. 6 shows a sample of the errors that may occur as a result of measuring the neighbor list channels while the local oscillator 22 is settling. Thus, when the local oscillator 22 is just turned on, the received signal may peak outside the filter, resulting in relatively large damping (noted generally at A). Subsequent measurements occurring later in time, have allowed the local oscillator to approach the operating frequency to a greater degree and result in increasingly less error (noted generally at B) until no error is present (noted generally at Z) and the signal is processed at the center line frequency of the filter. The present invention solves this as noted in block 118 by adjusting the magnitude of the measured signal to compensate for the frequency error.

The phone 10, and more particularly the processor 34, know how much to compensate as a result of a factory calibration routine. To compensate accurately for the frequency errors associated with measuring the channels of the Neighbor List when the local oscillator is settling to its operative frequency, an accurate calibration of the time constant must be measured for each mobile unit when the units are manufactured. The time constant can be used to compensate the magnitude error associated with each Neighbor List measurement. The time each measurement was taken is known relative to when the local oscillator tune voltage was applied. The shape factor of the filter and the expected bandwidth of the signal are known as a result of the standard under which the phone operates such as ANSI-136.

To measure the time constant of the local oscillator on each phone, a standard communications RF frequency counter and personal computer are required. Successively different time offsets relative to the tune voltage application on the local oscillator are used to trigger an RF frequency counter. The frequency reading on the counter at each point it triggered is recorded. For all triggers, or time points, a frequency value will be recorded. By incrementing the delay of each trigger time point and repeating, a table of time versus frequency can be built. This table then can be used to compensate for known frequency errors within the time limits of the calibration window. By using linear interpolation between calibration points, frequency errors can be calculated in real time as the mobile unit is performing the Neighbor List measurements.

Figure 7:
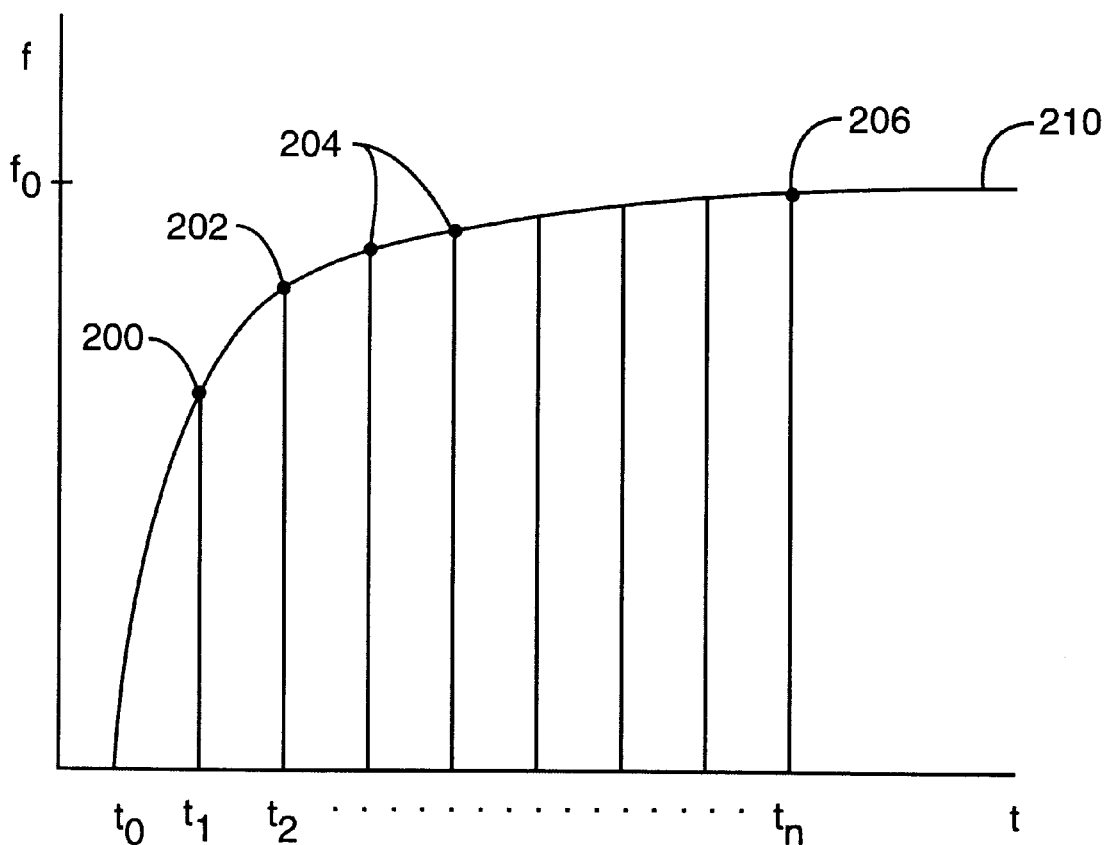
FIG. 7 is a frequency error versus time graph of the local oscillator showing the calculation of the calibration values.

Thus, as seen in FIG. 7, when the oscillator 22 is turned on, the frequency at which the oscillator 22 operates is designated by the line 210. A measurement 200 is initially taken at $t_0$ while the frequency 210 is still substantially below $f_0$, the operative frequency of the oscillator 22. Subsequent measurements 202 and 204 are taken at subsequent times $t_1$ to $t_n$ until measurement 206 is taken and frequency 210 is equal to the operative frequency $f_0$. While a particular curve 210 is shown, it should be appreciated that some oscillators 22 will have an oscillating curve 210 or a curve otherwise not shaped similarly to that in FIG. 7. The difference between the measured points 200, 202, 204 and $f_0$ form the basis of the offsets. These differences can be stored in a look up table or the like in memory 36 (FIG. 2) to provide the proper offsets or compensation factors used during block 118 (FIG. 4).

If the measured strengths are not going to be used to calculate an RSSI, then there are occasions when the compensation factors need not be applied at all. For example, if all of the compensation factors were less than 6 dB, and one channel was more than 6 dB stronger than all the other channels, then that channel is much stronger than the other channels, even after compensation. Thus, in this case, there is no need to use the compensation factors to know which channel is the strongest. However, the use of this technique is only appropriate when the measured strength is not being used, and the phone is only concerned with the instantaneous relative strengths of the channels on the neighbor list.

An alternate aspect of the present invention occurs during block 102 after the first sleep period has been completed. The phone 10 may store in memory 36 the relative strengths of the received and measured channels from the neighbor list. In a subsequent power up, the order in which the neighbor list channels are sorted in ascending power levels. Thus, the signals with the highest strengths are tested last, when the local oscillator 22 has settled and operates at the correct frequency. This allows the signal to be filtered at the appropriate center frequency, thereby reducing interference between channels.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of conserving power in a mobile communications device, said method comprising:

a) powering up a local oscillator;

b) during said powering up, checking a neighbor list for reselection candidates; and c) subsequently receiving a paging call, thereby shortening the amount of time that the local oscillator needs to be powered.

2. The method of claim 1 further comprising the step of demodulating the paging call.

3. The method of claim 1 further comprising compensating for off frequency errors that occur during the checking of the neighbor list for reselection candidates.

4. The method of claim 1 further comprising the step of storing in memory the relative received signal strengths of the reselection candidates.

5. The method of claim 4 further comprising the step of ordering the relative received signal strengths of the reselection candidates.

6. The method of claim 5 further comprising the step of putting the mobile communications device into a sleep mode after receiving the paging call.

7. The method of claim 6 further comprising the steps of subsequently repowering the local oscillator and checking the neighbor list for reselection candidates.

8. The method of claim 7 further comprising the step of during the subsequent repowering, checking the neighbor list in the order of ascending received signal strengths.

9. The method of claim 1 further comprising the step of providing compensation factors in a look up table.

10. The method of claim 9 further comprising the step of failing to use the compensation factors in the look up table if one received signal strength is greater by an amount exceeding any value in the look up table than the other received signal strengths of the reselection candidates.

11. The method of claim 1, further comprising:

comparing the relative received signal strengths of the reselection candidates; and storing the relative received signal strengths in ascending order in memory for use in subsequent power ups.

12. The method of claim 11 further comprising the step of providing a plurality of compensation factors in a look up table.

13. The method of claim 11 further comprising the step of compensating received signal strengths of the reselection candidates based on the frequency error of the local oscillator.

14. The method of claim 11 wherein checking the neighbor list occurs prior to the local oscillator settling.

15. A method of conserving power in a mobile communications device, said method comprising:

a) powering up a local oscillator;

b) prior to the local oscillator settling, receiving a signal outside a central frequency line of a filter within the mobile communications device; and c) compensating a power level associated with the received signal to correct a damping effect caused by the filter; and d) subsequently, when the local oscillator has settled, receiving a paging call, thereby shortening the amount of time that the local oscillator needs to be powered.

16. The method of claim 15 further comprising creating a compensation factor in a factory calibration procedure to be used in the step of compensating a power level.

17. The method of claim 15 further comprising the step of creating a plurality of compensation factors to be used in the step of compensating a power level.

18. The method of claim 17 further comprising the step of storing the plurality of compensation factors in a memory associated with the mobile communications device.

19. The method of claim 17 further comprising the step of storing the plurality of compensation factors in a look up table in a memory associated with the mobile communications device.

20. A method of conserving power in a mobile communications device, said method comprising:

powering up a local oscillator, the local oscillator requiring time to settle;

prior to the local oscillator settling, checking at least a portion of a neighbor list for reselection candidates based on output from said local oscillator;

after the local oscillator has settled, checking an assigned paging channel; and subsequently powering down the local oscillator.

* * * * *